(12) United States Patent
Patri

(10) Patent No.: US 9,864,346 B2
(45) Date of Patent: Jan. 9, 2018

(54) METHOD FOR CONNECTING A SUBSTATION AUTOMATION DEVICE ACCORDING TO IEC61850 TO ANY INDUSTRY AUTOMATION FIELD BUS

(71) Applicant: Schneider Electric Automation GmbH, Marktheidenfeld (DE)

(72) Inventor: Michael Patri, Aschaffenburg (DE)

(73) Assignee: SCHNEIDER ELECTRIC AUTOMATION GMBH, Marktheidenfeld (DE)

( * ) Notice: Subject to any disclaimer, the term of this patent is extended or adjusted under 35 U.S.C. 154(b) by 1131 days.

(21) Appl. No.: 13/845,151

(22) Filed: Mar. 18, 2013

(65) Prior Publication Data
US 2013/0338800 A1 Dec. 19, 2013

(30) Foreign Application Priority Data
Mar. 20, 2012 (EP) .................................... 12160443

(51) Int. Cl.
| | | |
|---|---|---|
| G06F 15/177 | (2006.01) |
| G05B 13/02 | (2006.01) |
| G05B 19/042 | (2006.01) |
| H04L 12/24 | (2006.01) |

(52) U.S. Cl.
CPC ........... *G05B 13/02* (2013.01); *G05B 19/042* (2013.01); *H04L 41/0816* (2013.01); *H04L 41/0843* (2013.01); *Y02B 70/3241* (2013.01); *Y04S 20/227* (2013.01); *Y04S 40/162* (2013.01)

(58) Field of Classification Search
CPC ... G05B 13/02; G05B 19/042; H04L 41/0816; H04L 41/0843; Y04S 20/227; Y04S 40/162; Y02B 70/3241; G06F 17/2247
USPC ............... 709/221; 715/234; 706/45; 700/28
See application file for complete search history.

(56) References Cited

U.S. PATENT DOCUMENTS

| | | | |
|---|---|---|---|
| 2007/0016896 A1 | 1/2007 | Wittmer et al. | |
| 2009/0076762 A1* | 3/2009 | Vetter | H04L 43/028 702/122 |
| 2010/0020724 A1* | 1/2010 | Wimmer | H02H 1/0061 370/254 |
| 2010/0293539 A1* | 11/2010 | Lefebvre | G05B 19/0426 717/174 |
| 2012/0239170 A1* | 9/2012 | Kulathu | G05B 19/0426 700/83 |

OTHER PUBLICATIONS

Search Report dated Apr. 20, 2012, corresponding to European Application No. 12 16 0443.

* cited by examiner

*Primary Examiner* — Frantz Jean
(74) *Attorney, Agent, or Firm* — Ladas & Parry LLP

(57) ABSTRACT

A method for connecting a switching station automation device, protection device or field device according to the IEC61850 communication standard to an industry automation field bus of an industry automation system. The method includes producing a modified SCL (Substation Configuration Description Language) technical manual file, SCL technical manual file is expanded by implementing at least one data object with mapping information in the form of communication- and functional parameters of the industry automation field bus, compiling the modified SCL technical manual file into a Device Type Manager component, and configuring the switching station automation device by the FDT frame application using the DTM component.

17 Claims, 9 Drawing Sheets

SLCE

```
<LN1>
  <object1> DOE1
    <Private>element defining the mapping</Private>   PE1
  </object1>
  <object2>  DOE2
    <object2.1>        DOE2.1
      <Private>element defining the mapping</Private>   PE2
    </object2.1>
    <object2.2>  DOE2.2
      <attribute2.2.1>   DAE1
        <Private>element defining the mapping</Private>   PE3
      </attribute2.2.1>
    </object2.2>
  </object2>
  <objectn>  DOEn
    <Private>element defining the mapping</Private>   PEn
  </objectn>
</LN1>
<LN2>
  ...
</LN2>
<LNn>
  ...
</LNn>
```

Fig. 3

```
            DOI
  <DOI name="PPV">
    <SDI name="phsAB">    SDI1                                         PE1
      <Private type="ModbusSerial">T:CM;M:3110:32U</Private>
      <DAI name="db" desc="unit: V"><Val>100</Val></DAI>  DAI1
    </SDI>
    <SDI name="phsBC">    SDI2                                         PE2
      <Private type="ModbusSerial">T:CM;M:3112:32U</Private>
      <DAI name="db" desc="unit: V"><Val>100</Val></DAI>  DAI2
    </SDI>
    <SDI name="phsCA">    SDI3                                         PE3
      <Private type="ModbusSerial">T:CM;M:3114:32U</Private>
      <DAI name="db" desc="unit: V"><Val>100</Val></DAI>  DAI3
    </SDI>
  </DOI>
```

Fig. 4

```
   PE                         F1     F2      F1n
<Private type="ModBusSerial">field_1;field_2;...field_n</Private>
```

Fig. 5

Definition of Modbus Modes.                           BSM
`<Private type="ModBusSerial_Mode">RTU</Private>`

Definition of the supported baud rates.
`<Private                                             MBSBR
type="ModBusSerial_SupportedBaudrate">1200;2400;9600;19200</Private>`

Definition of the supported address areas.           MBSAR
`<Private type="ModBusSerial_AddressRange">1:247</Private>`

Definition of the Modbus parity used.
`<Private type="ModBusSerial_Parity">none</Private>`  MBSP Definition of the amount of Modbus StopBits used.
`<Private type="ModBusSerial_StopBits">1</Private>`   MBSSB Definition of the physical interface.
`<Private type="ModBusSerial_Interface">RS485</Private>`  MBSI

Fig. 6

METHOD FOR CONNECTING A SUBSTATION AUTOMATION DEVICE ACCORDING TO IEC61850 TO ANY INDUSTRY AUTOMATION FIELD BUS

BACKGROUND OF THE INVENTION

The invention relates to a method for connecting a switching station automation device such as a station device, protection device or field device according to the IEC61850 communication standard to an industry automation field bus such as MODBUS of an industry automation system, a method for producing a DTM (Device Type Manager) component, whereby the DTM component represents the switching station automation device and makes defined interfaces available for an FDT frame program, as well as to a method for producing a technical manual file for carrying out the above methods.

Switching station automation devices are known in the area of the automation of the automation of electrical switching stations which devices exchange data according to the IEC61850 communication standard.

The IEC61850 (Communication Networks and Systems for Power Utility automation) communication standard is used in the area of the automation of electrical switching stations (Power Utility Automation (PUA)) and describes the exchange of data between intelligent electronic devices (IED)). The IEC61850-6 standard defines an SCL (Substation Configuration description Language) for this communication that is based on the XML (Extensible Markup Language). SCL files that describe the properties of an intelligent electronic device (IED) are, e.g., the ICD (IED Capability Description) or the .IID file (Instantiated IED Description).

Currently, no information about field busses of the industry automation in an SCL file is available and therefore it is not possible to generate a device DTM directly from an SCL file. Therefore, an integration of the devices in conformity with IEC61850 must take place by a manual configuration.

A known technology for handling industrial field devices in an industrial control- or visualization system is the FDT (Field Device Tool)/DTM (Device Type Manager) concept that is defined by the FDT specification of the FDT group. The FDT technology is communication-independent.

A DTM device is made available by a device manufacturer and represents the application logic as well as the parameters of the field device and can be used to operate and parameterize the field device on an industrial fieldbus. The DTMs run inside a frame application, the so-called FDT frame application. The FDT frame application can be implemented, e.g., in a device configuration program of a user console. The DTMs have a defined interface to the FDT frame application and can be used in any FDT frame application. Furthermore, a communication DTM is provided that is a communication interface to the particular fieldbus that can access the connected field devices.

A technical manual language such as FDCML (Field Device Configuration Markup Language), EDDL (Electronic Device Description Language) or DDXML (Device Description Extensible Markup Language) of an industry automation device can be used in order to generate a simple device DTM for the described device type. Several DTM generation tools are available for automatically generating a device DTM from a technical manual.

A method for producing software modules for field devices of process automation technology is described in DE 102 53 603 A1. The software modules serve as technical manuals and define interfaces for application programs in process guide systems. In the method syntactically and semantically correct standard technical manuals are produced from standard technical manuals for field devices and are converted by a compiler into corresponding software modules. The interfaces and the software modules correspond to the FDT/DTM specifications. PDM technical manuals, HCF technical manuals or company-specific technical manuals are indicated as standard technical manuals. The syntactically and semantically correct standard technical manual is indicated as an EDD1.1 technical manual that is produced by a converting of the standard technical manuals.

In the method syntactically and semantically correct standard technical manuals are prepared in a first method step from standard technical manuals such as PDM technical manuals, HCF technical manuals or company-specific technical manuals. A first compiler is used for this. The standard technical manual EDD1.1 is indicated as an example for a syntactically and semantically correct standard technical manual. Subsequently, the syntactically and semantically correct standard technical manual is converted with the aid of a second compiler into a software module such as, e.g., DTM, that has defined interfaces for the application programs in process guide systems. Significant advantages should result by the production of software modules by the intermediate step via an EDD.

In an article by T. Hartlich: "Generating DTM from existing EDD; Hindrances in the use of FDT/DTM technology can be eliminated", professional contribution in the A & D Newsletter of May, 2007 a DTM generator is described as a software tool that describes technical manuals that correspond to the IEC61804 standard. The IEC61804 standard describes the EDDL (Electronic Device Description Language).

U.S. 2007/0010896 A1 relates to a method for producing software modules for field devices of process automation technology. The software modules serve as technical manuals and have defined interfaces to application programs in process guide systems. In the method syntactically and semantically correct standard technical manuals are produced from standard technical manuals for field devices and are converted by a compiler into corresponding software modules.

U.S. 2010/0020724 A1 relates to a method for configuring an IEC61850-compatible, intelligent electronic device as part of a substation automation (SA) system with a configuration presentation according to the standard IEC61850, whereby the IED is a proxy IED for converting data between a communication protocol existing before the standard IEC61850 and a communication protocol according to IEC61850, and whereby the protocol conversion is based on a mapping record. It is provided in the method that the mappings are presented according to the standard IEC61850 in a standardized SA configuration technical manual file according to IEC61850 and that the proxy IED is configured by the standardized SA configuration file.

SUMMARY OF THE INVENTION

Starting from the above, the present invention has the problem of further developing a method of the initially cited type in such a manner that the connecting of devices in accordance with the IEC61850 standard to field busses according to the industry standard is significantly simplified.

The problem is solved in accordance with the invention by the following method steps:

Production of a modified SCL (Substation Configuration Description Language) technical manual file for the switching station automation device, whereby a standardized SCL technical manual file is expanded by implementing at least one data object with mapping information in the form of communication- and functional parameters of the industry automation field bus, Compiling the modified SCL technical manual file into a DTM (Device Type Manager) component in which data and functions of the switching station automation device including the mapping information are encapsulated and which serves as software module for the switching station automation device and has a defined interface to a FDT frame application in the industry automation system, Configuration of the switching station automation device by the FDT frame application using the DTM component, whereby a mapping of the IEC61850 communication- and functional parameters onto the communication parameters and functional descriptions of the industry automation field bus is carried out taking into consideration the encapsulated mapping information.

The invention is based on the idea of generating a DTM component for a switching station automation device based on an SCL technical manual file according to the IEC61850 industry communication standard in order to operate the switching station automation device according to the FDT/DTM concept on an industry automation field bus. The SCL technical manual can be used by the description of communication- and functional parameters of the industry automation field bus inside the SCL technical manual in order the generate the DTM component.

This achieves the advantage over the prior art that switching station automation devices can be operated according to IEC61850 by FDT/DTM technology on an industry automation field bus in common with industry automation devices. A DTM component for IEC61850 devices with additional field bus interfaces for the industrial automation would have to be manually produced in accordance with the state of the art.

A preferred method of procedure provides that the mapping information is encapsulated in a private XML element of the SCL technical manual file that is defined as an expansion of the SCL technical manual file.

Another preferred method of procedure is distinguished in that the private XML element is defined by a field bus type of the industry automation field bus as well as by one or more data fields, whereby a first data field represents the data object or data attribute. The data object field is defined by a capital letter followed by a data class type according to IEC61850 and the data attribute field is defined by a capital letter followed by a data attribute type according to IEC61850.

The first data field is preferably followed by other data fields, whereby the other data fields represent the functional secondary conditions (FC=Functional Constraints) according to the IEC61850 standard such as a digital status field, a measured value field, a digital control field, a scaling value field, scaling register field and/or an input value field as well as also the parameters necessary for their imaging on the particular industry automation field bus.

It is provided that a description of specifications of the industry automation field bus MODBUS takes place in the SCL technical manual file. This creates the prerequisite that the SCL technical manual file can be used to generate a DTM or another technical manual file.

The communication parameters of the industry automation field bus MODBUS such as, e.g., communication mode, baud rate, address range, parity, stop bits as well as interfaces are preferably defined in at least one private XML element of the SCL technical manual file.

It is furthermore provided that the description of the field bus parameter mappings takes place in the data-object- or data-attribute XML elements of the SCL technical manual file.

The data structure—viewed from the SCL technical manual file—is preferably also visible in the produced DTML (Device-Type-Manager) component. An .ICD file or .IID file is preferably used as SCL technical manual file.

Furthermore, the invention relates to a method for producing a DTM component, whereby the DTM component serves as a software module and has defined interfaces to an FDT frame application.

In order to produce the DTM component, it is provided that a standard SCL technical manual file according to IEC61850 is modified in that data-objects with mapping information in the form of communication parameters and functional parameters of an industry automation field bus are implemented in the SCL technical manual file, and that the DTM component is subsequently generated from the modified SCL technical manual file by a generator.

It is provided according to a preferred method of procedure that the DTM component is generated by a compiler directly from the modified SCL technical manual file.

It is alternatively provided that the DTM component is generated from the modified SCL technical manual file, whereby the SCL technical manual file is compiled by a first compiler at first into a standard technical manual file such as a DDXML file and the latter by another DTM generating tool into the DTM component.

Also, the modified SCL technical manual file can be directly or indirectly interpreted in an interpreter during their run time of a generic DTM component.

During the compiling of the modified SCL technical manual file a check is made whether mapping information is contained in the file and whether appropriate data is available, whereby, if necessary, external data such as definitions from the IEC61850 standard are accessed.

It is furthermore provided that during the analysis of the modified SCL technical manual file a search is made for mapping information, in particular the private XML elements, and that the mapping information is extracted, and that the extracted data of the mapping information forms the basis for the generation of the DTM component.

Also, field bus-independent data such as product name, manufacturer name or version number can be extracted to build up a graphic operating surface of the switching station automation device.

For falling back onto present DTM generating tools, it is provided that the modified SCL technical manual file is compiled at first into a standard technical manual file, whereby the method step of the compiling comprises the following steps:
  Checking the SCL technical manual file regarding the availability of bus-specific mapping information,
  Searching for private XML elements in the SCL technical manual file, and
  Extracting the description of a mapping of IEC61850 objects onto the industry automation field bus.

The SCL technical manual file is preferably read into a compiler, whereby the validity of the SCL technical manual file is checked, if necessary. Furthermore, the SCL technical manual file is analysed as regards available mapping information and is subsequently compiled into a standard technical manual file. The standard technical manual file is subsequently compiled by a generating tool into the software module.

It is suggested as an alternative method of procedure that the SCL technical manual file is interpreted by an interpreter during the run time of a generic DTM component, whereby the SCL technical manual file is at first filed in a memory and is imported after the start of the generic software module. Then the SCL technical manual file is analysed regarding available data in that mapping information is sought that describes a mapping of the available IEC61850 objects on the industrial automation field bus. The mapping information is subsequently extracted.

Other details, advantages and features of the invention result not only from the claims, the features to be gathered from them—by themselves and/or in combination—but also from the following description of preferred embodiments.

BRIEF DESCRIPTION OF THE DRAWINGS

In the figures:

FIG. 3 shows a structure of a logical node in an SCL technical manual file with incorporations of private XML elements, FIG. 4 shows additional communication parameters in an ICD file by private XML elements, FIG. 5 shows a mapping of customary MODBUS communication parameters on IEC61850 objects, FIG. 6 shows an extract from a modified SCL technical manual file.

DESCRIPTION OF THE PREFERRED EMBODIMENTS

Figure 1:
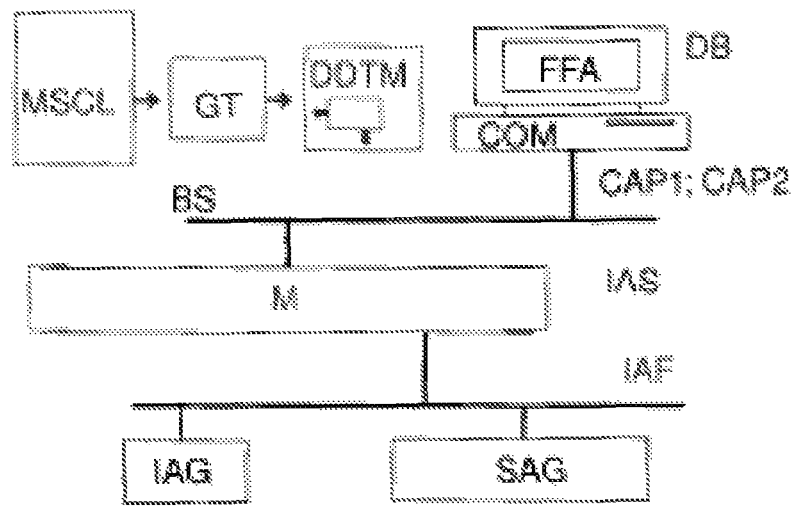
FIG. 1 shows a schematic view of an industry automation system with a switching station automation device.

FIG. 1 shows in a purely schematic manner a method for connecting a switching station automation device SAG such as a station device, protection device or field device according to the IEC61850 communication standard to an industry automation field bus IAF such as MODBUS of an industry automation system IAS. The method comprises the production of a modified SCL technical manual file MSCL for the switching station automation device SAG, whereby at least one data object with mapping information in the form of communication- and functional parameters of the industry automation field bus IAF is implemented into a standardized SCL technical manual file. Then a DTM component DDTM is generated from the modified SCL technical manual file MSCL by a generating tool GT. All data and functions of the switching station automation device SAG including the mapping information is encapsulated in the DTM component. The latter can then serve as a DTM component for the switching station automation device and has a defined interface to an FDT frame application FFA in the industry automation IAS. Then the configuration of the switching station automation device SAG takes place by the FDT frame application using the DTM component DDTM. Then the IEC61850 communication- and functional parameters can be transmitted via the industry automation field bus IAF while taking account of the encapsulated mapping information.

Figure 2:
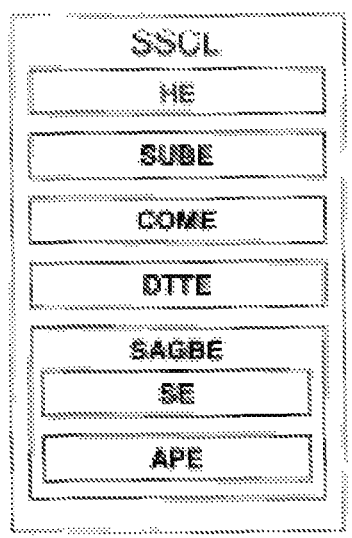
FIG. 2 shows a structure of a standard SCL technical manual file.

FIG. 2 shows a data structure of an SCL technical manual file SCLGBD according to the communication standard IEC61850 for adjusting switching station automation devices of energy automation that are designated as intelligent electronic devices (IED Intelligent Electronic Device). The technical manual file SCLGBD comprises a header element HE that identifies the technical manual file SCL-GBD and in particular contains information about the version and revisions. Furthermore, a substation element SUBE is provided that describes the functional structure of a switching station in which the switching station automation devices are to be used.

Furthermore, a communication element COME is provided in which direct communication connections according to the communication standard IEC61850 are described.

Data types are defined, in particular logical node types that can be instanced, in a data type template element DTTE.

Furthermore, a device element SAGBE is provided that describes the configuration of the SAG device. A service element SE is provided inside the device element SAGBE which service element defines available services for the exchange of data defined in IEC61850. Furthermore, an access point element APE is provided that defines available communication access points regarding the functionality of the SAG device.

Data types in the form of logical nodes LN1 . . . LNn are defined in the data type template element DTTE. A logical node LN1 . . . LNn is bundled from data object elements DOE that again comprise a data object type based on a CDC (Common Data Class) defined in the communication standard IEC61850-7-3. Also, data attribute types and enumeration types are defined in the DTTE.

FIG. 3 shows in a purely schematic manner an extract SCLE of an SCL technical manual file that represents the structure of the logical node LN1 . . . LNn. In the example shown the logical node LN1 comprises the data object elements DOE1, DOE2 . . . DOEn, whereby, e.g., the data object element DOE2 comprises data object elements DOE2.1, DOE2.2 and the data object element DOE2.2 defines a data attribute element DAE1.

The logical nodes LN1 . . . LNn describe the smallest unit of a device function. The logical nodes LN1 . . . LNn are formed from the data object elements DOE1 . . . DOE2, that describe the data (mapping information) to be exchanged.

Data object types consist of data attribute elements DAE or already defined data object elements. The data attribute element DAE has a functional limitation and can be either a base type, an enumeration or a structure of a data attribute type.

According to the invention the data object elements DOE1 . . . DOE2 are used in order to take up parameters/information of an industry automation field bus into the SCL technical manual file SCLGBD. This expansion takes place by taking up private XML elements PE1, PE2, PE3 into the particular data object elements DOE1 . . . DOE2 or data attribute elements DAE1 . . . DAEn.

FIG. 4 shows an extract SCLE of an SCL technical manual file into which mapping information of an industry automation field bus IAF is implemented using the example of the MODBUS serial line field bus. A data object DOI is shown. This data object again comprises sub-data objects SDI1 . . . SDI3. The sub-data objects SDI1, SDI2, SDI3 are used to define special, instance-related values for the data objects and their attributes.

In the exemplary embodiment shown so-called private XML elements PE1, PE2, PE3 of a specific type are used inside the data object elements DOI, sub-data object elements SDI1 . . . SDI3 and data attribute elements DAI1 . . . DAI3 that describe a mapping of the corresponding elements onto the communication of the industry automation field bus.

Each <private> XML elements PE1-PE3 has a manufacturer-related type as attribute, in the present case the field bus type MODBUS serial line, characterized by the type designation "ModbusSerial". A description of the data used follows by way of supplementation. The communication parameters are imaged and mapped according to the definition shown in FIG. 5.

FIG. 5 schematically shows the construction of an XML private element PE for describing the data mapping between the IEC61850 objects and their imaging on an industrial automation field bus IAF using the example of a Modbus serial line.

The imaging of the IEC61850 objects onto the industrial automation field bus IAF, is formed, like for the MODBUS data, from several fields F1 . . . Fn separated by semicolons, as shown in FIG. 5.

The first field F1 always represents a data object, sub-data object or a data attribute, optionally followed by one or more data reference fields F2 . . . Fn. The data object field F1 is represented by a capital letter, e.g., "T", followed by a colon and two capital letters that describes the "common data class" according to IEC61850. The data attribute field is represented by a capital letter, e.g., "A" followed by a colon and two capital letters that describe the attribute type according to IEC61850.

The description of the MODBUS parameter mapping is directly indicated in each data object, sub-data object- and data attribute XML element in the SCL file of the IED according to FIG. 5, so that the necessary information is available with these additional parameters for transmitting the IEC61850 objects over an, e.g., MODBUS serial line.

FIG. 6 shows by way of example a listing of communication parameters that are defined under the XML element <LDevice> inside the ICD file of the field device in conformity with the IEC61850 standard. General communication parameters of an industrial automation field bus IAF are described here. These general communication parameters such as communication mode MBSM, baud rate MBSBR, address range MBSAR, parity MBSP, stop bits MBSSB and interface MBSI describe the supported communication properties of the described field bus interface. The communication parameters are shown using the example of a MODBUS serial line.

Although the example is based on the MODBUS serial line field bus type, it is also possible to expand the ICD file with information of other field buses. Consequently, it is also possible to generate DTMs from ICD files with expansions for other field buses. Furthermore, there is the possibility of using other SCL file formats than the ICD file as input for the generation of DTMs because the device properties described in the other file formats are comparable, so that these file formats can be expanded by the same mechanisms.

However, the ICD file is probably preferred as the most customary SCL file format for the generation of DTMs in accordance with the invention.

The private XML elements PE1 . . . PEn of the specific type inside the data object elements DOE1 . . . DOEn and DOI, SDI1 . . . SDI3 OR DAI1 . . . DAI3 elements describe a mapping of the corresponding data element on the industrial field bus communication.

Figure 7:
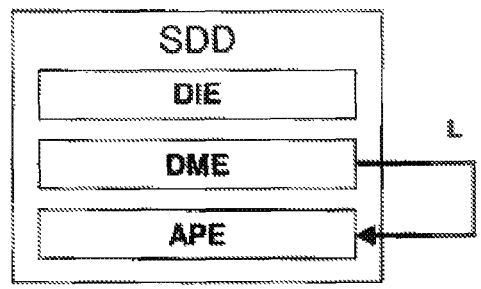
FIG. 7 shows the structure of a standard technical manual file of an industrial field device.

FIG. 7 shows a simple structure of a standard technical manual file SDD of the industrial field device IFG for operating on the industrial field bus IAF as MODBUS. The technical manual file SDD comprises an area for the device identity, described here as Device Identity Element DIE, an area for the device properties, described here as Device Manager Element DME and an area for the device parameters and its behavior, described here as Application Process Element APE.

The Device Identity Element DIE defines general, network-independent properties whereas the Device Manager Element DME describes communication parameters of the industrial field device IFG. The Device Manager Element DME comprises a part such as, for example, transfer rates, which part is independent of the function of the industrial field device IFG, comprises supported slave addresses, etc. and a part in which the mapping of the functional parameters onto the associated communication is defined.

The Application Process Element APE defines the functionality of the field device independently of the network used. The field device parameters are specified in this element that can be transmitted via the industrial field bus IAF. A connection between the communication parameters and the field device parameters is established by a link L. The communication parameters must be mapped on the corresponding field device parameters.

Figure 8:
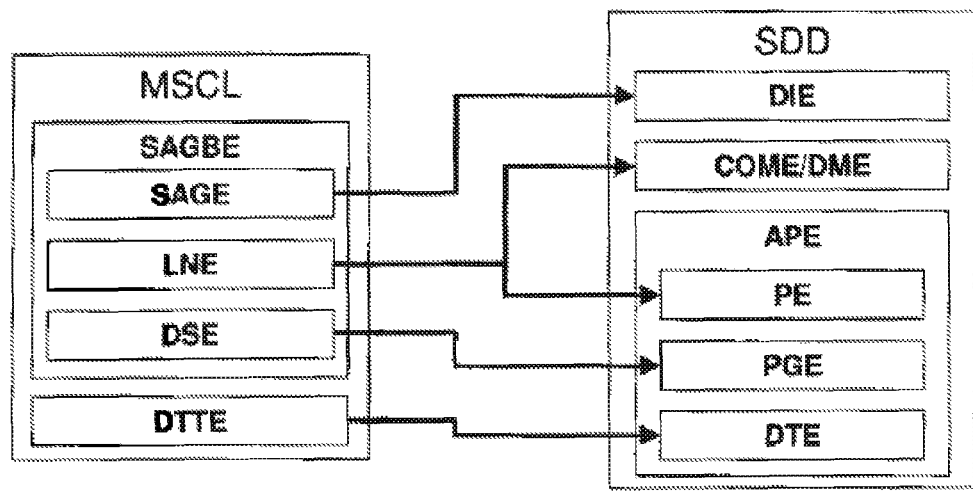
FIG. 8 shows a schematic view of a mapping of a modified SCL technical manual file on a standard technical manual file.

According to the present invention the device element SAGBE is used as a constituent of the SCL technical manual file SSCL according to FIG. 2 in order to prepare a modified SCL technical manual MSCL according to FIG. 8.

The Data Type Template Element DTTE is used as a supplement to the device element SAGBE in order to reproduce the structure of the logical nodes LN1 . . . LNn inside the technical manual SDD used in industrial automation.

The information necessary for the communication area of the Device Manager Element DME of the technical manual SDD is found in specific Private Elements PE1 . . . PE3, whereby the functional information for the device is indicated to the corresponding Data Object Elements DOE1 . . . DOEn of the logical nodes LN1 . . . LNn. The specific private elements are also used that describe the general communication parameters.

FIG. 8 shows a mapping of the modified MSCL technical manual file MSCL onto a standard technical manual file SDD that is used to utilize the switching station automation device SAG according to the FDT/DTM concept.

The modified SCL technical manual file MSCL contains in the technical manual element SAGBE a device information element SAGE with general device information of the switching station automation device SAG that is filed as attributes of the device information element inside the field device element SAGE. The device info is mapped onto the Device Identity Element DIE of the technical manual file SDD.

Furthermore, one or more logical node elements LNE are provided in the technical manual element SAGBE that are used to describe parameters within the Application Process Element APE of the technical manual file SDD and to map these parameters onto the corresponding industrial field bus IAF in the communication area COME of the Device Manager Element DME.

Furthermore, one or more Data Set Elements DSE are defined in the technical manual SAGBE that represent a grouping of objects and can be used to form a group of parameters or a parameter group PGE within the technical manual file SDD.

The Data Type Template Element DTTE of the modified SCL technical manual file MSCL can be used to produce the same IEC61850 structure in the technical manual file SDD.

Figure 9:
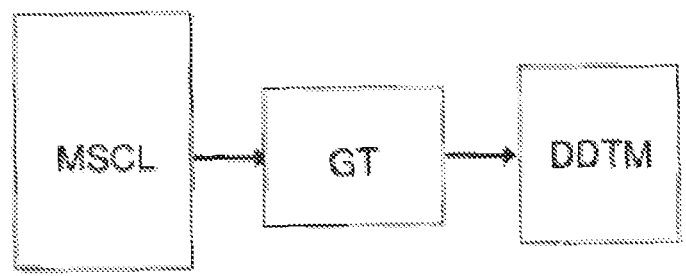
FIG. 9 shows a schematic view of the generation of a device DTM by a DTM generating tool from a modified SCL technical manual file.

FIG. 9 shows in a purely schematic manner the base idea of the invention, namely, the generating of a software module DDTM of the device SAG in conformity with IEC61850 and in the form of a DTM device directly from the modified SCL technical manual file MSCL by a DTM generating tool GT. According to the invention, at first information of the field bus IAF, e.g., "MODBUS Serial Line" is inserted into the modified SCL technical manual file MSCL.

Figure 10:
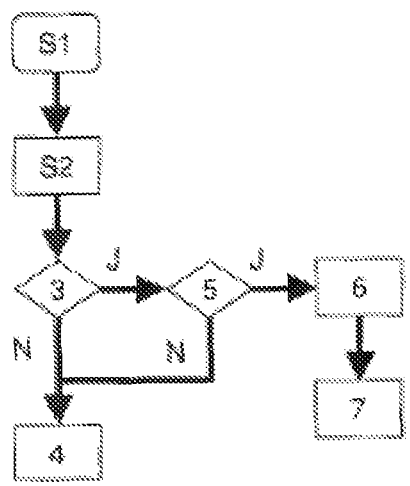
FIG. 10 shows a flow diagram of the first method according to FIG. 9 for generating a DTM from an SCL file in accordance with the scheme shown in FIG. 2.

FIG. 10 shows a method course of the method in accordance with FIG. 9. After the start of the DTM generating tool GT in method step S1 the SCL file MSCL is imported into the DTM generating tool GT in a method step S2. The validity of the SCL file is checked, if necessary, in a method step S3 immediately after this file was imported. If the SCL file should not be valid relative to the definitions of the DTM generating cool, the DTM generating tool is not capable of generating the device DTM, so that the method is stopped in the method step S4.

If the method step S3 is not carried out or the check has shown that the SCL file is valid, the SCL file is analyzed in method step S5 regarding the availability of data that describes the necessary information for the industrial automation field bus IAF. During the analysis a search is made for the <private> XML elements that describe the field bus mapping onto the IEC61850 objects.

If such field bus-describing data is not available in the IEC61850 objects used in the SCL file the DTM generating tool is not capable of generating the device DTM, so that the method is stopped in method step S4.

If a description of a mapping of IEC61850 objects in an industrial field bus is available the DTM generating tool GT can extract this data in method step S6. Then, the concluding step of the DTM generation takes place in method step S7. Field-bus-independent data such as, for example, product name, manufacturer name, version number, etc. can be optionally used to improve, e.g., the graphic user interface of the device DTM.

Figure 11:
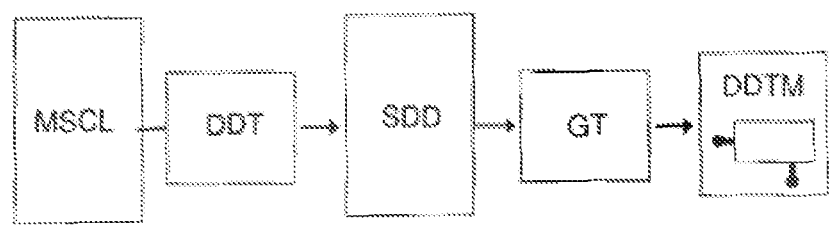
FIG. 11 shows a schematic view of a second method for generating a DTM from an SCL file in accordance with a second embodiment.

FIG. 11 show in a purely schematic manner a second method for generating the software module DDTM in the form of a device DTM from a technical manual file in the form of an SCL technical manual file MSCL. In this method the technical manual file MSCL is compiled by a compiler DDT into a standard technical manual SDD from which the software module DDTM is then generated by a DTM generating tool GT. This method is distinguished in that existing DTM generating tools GT are available for customary rule descriptions such as FDCML, EDDL or DDXML and can therefore be used.

Figure 12:
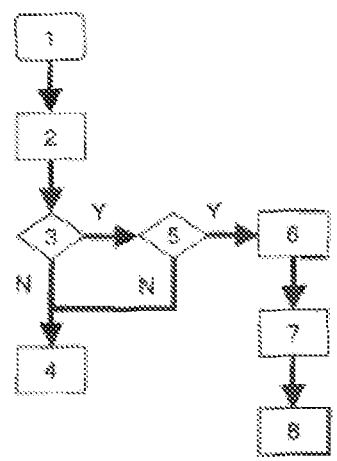
FIG. 12 shows a flow diagram of the second method according to FIG. 11.

FIG. 12 shows a flow diagram of the second method for the DTM generation according to FIG. 11, whereby at first a compiling of the SCL file MSCL in the compiler DDT takes place. After the start of the technical manual compiler DDT in method step S1 the SCL file is imported in method step S2 into the compiler DDT. The validity of the SCL file is optionally checked in method step S3. If the SCL file is not valid relative to the definitions of the technical manual compiler DDT, the compiler DDT is not capable of generating the standard technical manual file SDD from the SCL file, so that the method is concluded in method step S4.

If a check in accordance with method step S3 should not be carried out or if the SCL file is valid, the SCL file is analyzed in method step S5 regarding the availability of data that described the necessary information for the industrial automation field bus IAF. A search for <private> elements can take place here that describe the field bus mapping onto the IEC61850 objects. If such field bus data descriptions of IEC61850 objects should not be available, the compiler DDT is not capable of generating a standard technical manual from the SCL file, so that the method is concluded in step S4.

In as far as a description of a mapping of the IEC61850 objects onto the industrial field bus is available, the compiler DDT can extract this data in method step 6. This data as well as field-bus-independent data such as, for example, product name, manufacturer name, version number, etc. are required in order to carry out an automatic generation of a standard technical manual SDD in method step S7. The standard technical manual SDD is used as input file for an existing DTM generating tool GT in order to automatically generate a software manual DDTM in the form of a device DTM.

Figure 13:
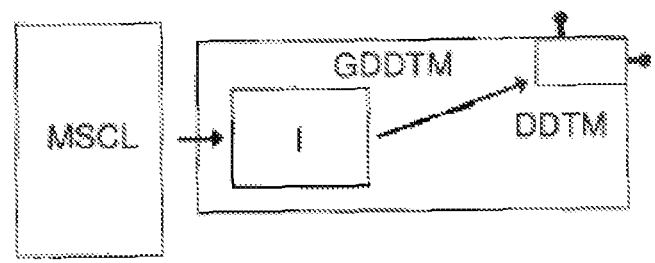
FIG. 13 shows a schematic view of a third method with the aid of a generic DTM component, whereby the generic DTM component directly interprets the SCL file.

FIG. 13 shows in a purely schematic manner a third method for using a software module DDTM in the form of a device DTM with inclusion of a technical manual file MSCL in the form of an SCL file. In this method the SCL file is interpreted by an interpreter I during the run time of the device DTM. In this instance the device DTM is designated as a generic DTM since the device DTM was not developed for a specific device.

Figure 14:
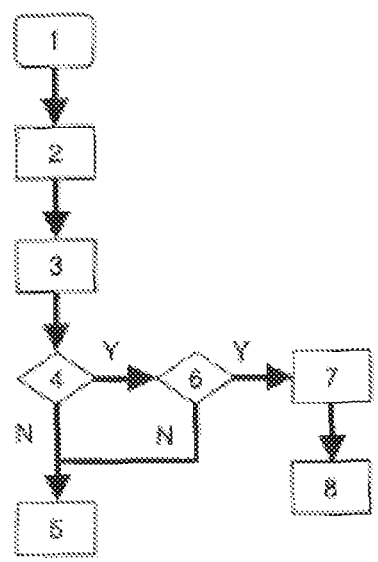
FIG. 14 shows a flow diagram of the third method according to FIG. 13.

FIG. 14 shows a method course of the method according to FIG. 13. The method is carried out during the run time of a device DTM. In a method step S1 the SCL file or SCL files must be filed in a specific memory in order that the generic device DTM can access the SCL file or SCL files. After the starting of the generic device DTM in an associated FDT frame in accordance with method step S2 the SCL file is imported in method step S3 into the generic device DTM. Optionally, the validity of the SCL file can be checked in method step S4. If the SCL file should not be valid relative to the definitions of the generic device DTM, the DTM is not capable of interpreting the SCL file and the method ends with method step S5.

If no check should take place and/or should the SCL file be valid in accordance with the criteria of the generic device DTM, the SCL file is analyzed in method step S6 according to available data which can also be accessed via the field bus such as, e.g., MODBUS Serial Line.

The analysis takes place in that <private> elements are sought that describe the field bus mapping of the IEC61850 objects. If such descriptions of field bus data are not available in the SCL file used, the generic device DTM is not capable of interpreting the SCL file, so that the method stops in method step S5.

In as far as a description of a mapping of IEC61850 objects onto a field bus is available, the generic device DTM can extract this data in method step S7. This data is needed to obtain access to the data via an industrial field bus by using the FDT/DTM technology (method step S8). Optionally, other field-bus-independent data such as, e.g., product name, manufacturer name, version number, etc. can be used to display these values to a user in a graphic user surface of the DTM.

Figure 15:
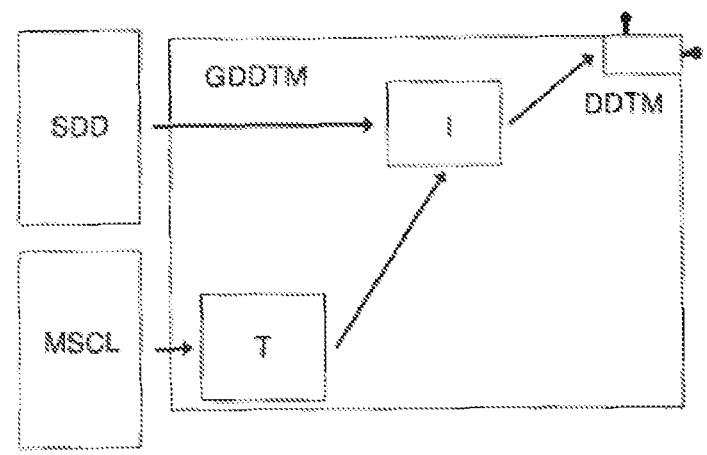
FIG. 15 shows a schematic view of a fourth method with the aid of a generic DTM component, whereby the generic DTM component compiles the SCL file into a standard technical manual.

FIG. 15 shows another embodiment of the method, whereby a generic device DTM GDDTM comprises an interpreter I that interprets either the standard technical manuals SDD or modified SCL technical manuals MSCL in the form of SCL files that were compiled previously by the compiler T. The method is carried out during the run time of the device DTM.

Figure 16:
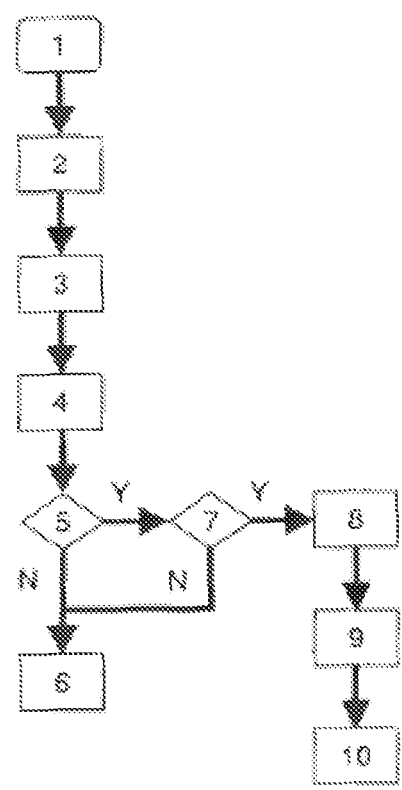
FIG. 16 shows a method course of the fourth method according to FIG. 15.

A corresponding flow diagram is shown in FIG. 16. The SCL file or SCL files must be filed in method step S1 in a specific memory area such as, e.g., Device Library Folder in order that the files can be reached by the generic device DTM. After the start of the generic device DTM according to method step S2 in an associated FDT frame the SCL file is also imported in method step S3 into the generic device DTM.

A compiler T is started in the generic device DTM in method step S4. The validity of the SCL file can be optionally checked in method step S5. If the SCL file is not valid relative to the definitions of the compiler T, the method ends in method step S6.

If the check should not take place or the SCL file be valid, the SCL file is analyzed concerning available data in method step S7 that can also be accessed via a field bus, e.g., MODBUS Serial Line. The analysis can be carried out by searching the <private> elements that describe the field bus mapping of the IEC61850 objects. If such field bus data descriptions should not be available in the SCL file used, the compiler T is not capable of generating a technical manual from this SCL file, so that the method ends in method step S6.

If the description of the mapping of IEC61850 objects onto an industrial field bus is present, the compiler T can extract this data in method step S8. This data together with a few field-bus-independent data such as product name, manufacturer name, version number, etc. are required in order to carry out an automatic generation of a standard technical manual SDD in method step S9. This standard technical manual SDD is only available internally in the generic device DTM and can be used by an already existing part of the generic device DTM in order to obtain access in method step S10 to the data via the industrial field bus by using the FDT/DTM technology.

Figure 17:
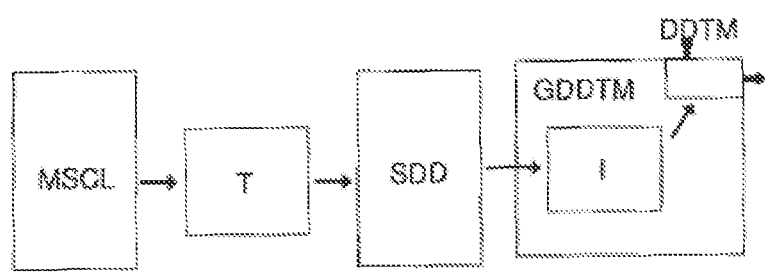
FIG. 17 shows a fifth embodiment of the method of the invention.

FIG. 17 shows a method of procedure in which the compiler T is arranged outside of the generic device DTM GDDTM. In this method the generated standard technical manual SDD in method step S8 according to FIG. 12 is not used to generate a device DTM in a DTM generating tool but rather as input file for the generic device DTM.

The invention opens the possibility of generating a DTM directly from an SCL technical manual file of an IED according to the IEC61850 standard. This is achieved by describing the industrial field bus within the SCL description, whereby the SCL description is used to generate a DTM.

The FDT/DTM technology was previously not available in the area of the IEC61850. The possibility of the automatic generation of DTMs is opened by the production of DTMs on the basis of SCL descriptions with the consequence that the FDT/DTM technology can be used in the IEC61850 area. Thus, there is the possibility on the one hand of readily combining field devices of the industry automation and on the other hand of readily combining IEC61850 devices in an automation system by FDT/DTM technology.

Consequently, the integration of energy devices according to the IEC61850 standard as well as the data associated with them into an industrial application can be realized in a very simple manner.

The invention claimed is:

1. A method for configuring a substation automation device (SAG) in a form of a station device, protection device, or field device according to the IEC61850 communication standard, and connecting the substation automation device (SAG) to an industry automation field bus (IAF) of an industry automation system (IAS), the method comprising:

providing a modified SCL (Substation Configuration Description Language) description file (MSCL) for the substation automation device, whereby a standardized SCL description file (SSCL) is expanded by implementing at least one data object (DOE1 . . . DOEn) with mapping information in the form of communication and functional parameters of the industry automation field bus (IAF), compiling the modified SCL description file (MSCL) using a generating tool (GT) running on a processor into a DTM (Device Type Manager) component (DDTM) in which data and functions of the substation automation device (SAG), including the mapping information, are encapsulated, and which serves as a software module for the substation automation device (SAG), and has a defined interface to an FDT frame application (FFA) in the industry automation system (IAS), connecting the substation automation device (SAG) to the industry automation field bus (IAF), configuring the substation automation device (SAG) by means of the FDT frame application (FFA) running on a processor (COM) of the industry automation system (IAS) using the DTM component (DDTM), and transmitting, by the processor (COM), the IEC61850 communication and functional parameters via the industry automation field bus (IAF), whereby a mapping of the IEC61850 communication and functional parameters onto the communication parameters and functional descriptions of the industry automation field bus (IAF) is carried out taking into consideration the encapsulated mapping information.

2. The method according to claim 1, wherein the mapping information is encapsulated in a private XML element (PE1 . . . PEn) of the SCL description file (MSCL).

3. The method according to claim 2, wherein the private XML element (PE1 . . . PEn) is defined by a field bus type of the industry automation field bus as well as by one or more data fields (F1 . . . F2), whereby a first data field (F1) represents a data object or data attribute, whereby the data object field is defined by a capital letter followed by a data class type according to IEC61850 and whereby the data attribute field is defined by a capital letter followed by a data attribute type according to IEC61850.

4. The method according to claim 3, wherein the first data field (F1) is followed by other data fields (F2 . . . Fn) that represent the functional secondary conditions (FC=Functional Constraints) according to the IEC61850 standard, in a form of a digital status field, measured value field, digital control field, scaling value field, scaling register field and/or an input value field.

5. The method according to claim 1 wherein the communication parameters of the industry automation field bus (IAF) in a form of a communication mode (MBSM), baud rate (MBSBR), address range, parity (MBSP), stop bits (MBSSB) as well as interfaces (MBSI) are defined in at least one private XML element (PE1 . . . PEn) within the L-device XML element of the SCL description file (MSCL).

6. The method according to claim 1, wherein a description of the field bus parameter mapping takes place in the Data Object Elements (DOE1 . . . DOEn), the sub-data object elements (SDI1 . . . SDI3) or Data Attribute XML Elements (DAI1 . . . DAI3) of the SCL description file (MSCL), whereby a data structure given from the SCL description file (MSCL) is also visible in the generated DTM (Device Type Manager) component (DDTM).

7. The method according to claim 1, wherein an ICD file or IID file is used as the SCL description file (MSC).

8. A method for producing a DTM (Device Type Manager) component (DDTM) by means of a DTM generating tool (GT), the method comprising:
   modifying a standard SCL description file (SSCL) according to the IEC61850 communication standard in that IEC61850 objects with mapping information in a form of communication parameters and functional parameters on an industry automation field bus (IAF) are implemented into the SCL description file, and
   generating the DTM component (DDTM) by a DTM generating tool (GT), running on a processor, from the modified SCL description file (MSCL),
   wherein the DTM component (DDTM) serves as a software module and has defined interfaces to an FDT frame application (FFA) running on a processor (COM) of the industry automation system (IAS).

9. The method according to claim 8, wherein the DTM component (DDTM) is generated by the DTM generating tool (GT) in a form of a compiler directly from the modified SCL description file (MSCL).

10. The method according to claim 8, wherein the DTM component (DDTM) is generated directly from the modified SCL description file (MSCL), whereby the SCL description file is at first compiled by a first compiler (DDT) into a standard device description file (SDD), including a DDXML file, and the latter is compiled by the DTM generating tool (GT) in a form of a standard DTM generating tool into the DTM component (DDTM).

11. The method according to claim 8, characterized in that the modified SCL description file (MSCL) is interpreted directly or indirectly during the run time of the DTM component in an interpreter (I).

12. The method according to claim 8, wherein a check is made during the compiling of the modified SCL description file (MSCL) whether mapping information is contained in the file and whether corresponding data is available.

13. The method according to claim 8, wherein, during the analysis of the modified SCL description file (MSCL), a search is carried out for mapping information the private XML elements (PE1 . . . PEn), that the mapping information is extracted, and that the extracted data forms the basis for the generation of the DTM component.

14. The method according to claim 8, wherein field-bus-independent data, including product name, manufacturer name, or version number, is extracted for forming a graphic operating surface of the substation automation device.

15. The method according to claim 8, characterized in that the modified SCL description file (MSCL) is compiled into a standard device description file (SDD), wherein the method step of the compiling comprises the following steps:
   checking the SCL description file (MSCL) regarding the availability of bus-specific mapping information,
   searching for private XML elements (PE1 . . . PEn) in the SCL description file, and
   extracting a description of a mapping of IEC61850 objects onto the industry automation field bus (IAF).

16. The method according to claim 8, wherein:
   the SCL description file (MSCL) is read into a compiler,
   the validity of the SCL description file (MSCL) is checked, if necessary,
   the SCL description file (MSCL) is analysed regarding available mapping information,
   the SCL description file (MSCL) is compiled into the standard device description file (SDD), and
   the standard device description file (SDD) is compiled by the DTM generating tool (GT) in a form of a generating tool into the software module (DDTM).

17. The method according to claim 16, wherein:
   the SCL description file (MSCL) is interpreted by the interpreter (I) during the run time, whereby the SCL description file is at first filed in a memory,
   the SCL description file (MSCL) is imported after the start of the generic software module (GDDTM), and
   the SCL description file (MSCL) is analysed regarding available data in that mapping information is sought that describes a mapping of the available IEC61850 objects on the industrial automation field bus (IAF), and that the mapping information is extracted.

* * * * *